Figure 1:
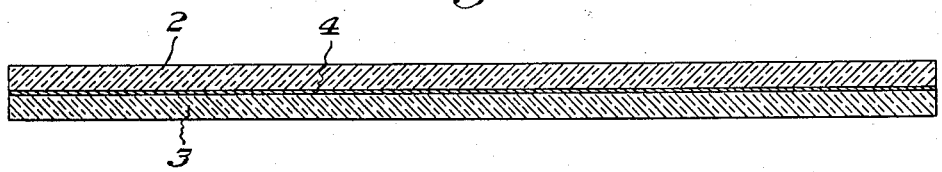

June 19, 1934.  W. L. MONRO  1,963,798
LAMINATED GLASS
Filed Dec. 18, 1933

INVENTOR

Patented June 19, 1934

1,963,798

UNITED STATES PATENT OFFICE 1,963,798

LAMINATED GLASS

William L. Monro, Pittsburgh, Pa.

Application December 18, 1933, Serial No. 702,876

11 Claims. (Cl. 49—92)

This invention relates to the manufacture of glass, and is for an improvement in laminated glass. The present application is a continuation-in-part of my application Serial No. 240,202, filed December 15, 1927.

It has long been known that laminated glass can be made by cementing two sheets of glass together with a transparent cement, such as celluloid, and glass made of laminated sheets of ground and polished sheets, has gone into wide commercial use. It has also been proposed to make laminated glass by cementing sheets of ordinary clear glass, such as common window glass, together.

Ordinary drawn glass or window glass, even of high quality, is known to possess slight irregularities or to have a somewhat wavy appearance. When two sheets of it are cemented together, this irregular or wavy appearance is retained.

Laminated glass formed of two lights of ground and polished glass, while being highly satisfactory, is very expensive to produce. I have discovered that by combining a sheet of ground and polished glass with a sheet of ordinary clear glass, a laminated product can be secured which is practically indistinguishable from glass formed of two ground and polished sheets except when viewed at a very acute angle. The wave-like appearance or irregularities of the clear glass are not apparent when the same is laminated with a sheet of ground and polished glass except when so viewed. Inasmuch as ordinary clear glass can be manufactured much more cheaply than ground and polished glass, the invention provides a commercially satisfactory laminated glass which can successfully replace glass formed of two ground and polished sheets.

It is possible by the present invention to make a much thinner sandwich than can be made from plate glass on a commercial scale. From the standpoint of cost, it would seem desirable to make the sandwich relatively thin, but with an all plate glass sandwich, the cost rapidly increases as the glass is made thinner. It is difficult to form a very thin plate glass blank and the problem of grinding increases the thinner the glass is ground. Difficulty is encountered in that the glass sometimes becomes wedge-shaped or does not have the two sides perfectly plane. The minimum practical thinness of an all plate glass sandwich is materially thicker than necessary from the standpoint of strength and, in fact, the added thickness makes the glass less safe. By my invention, it is possible to make sandwiches sufficiently thin that they can be substituted for ground and polished sheets ordinarily employed in car windows and windshields. The importance of this may be appreciated when it is considered that broken windows are always being replaced in automobiles.

My invention may be readily understood by reference to the accompanying drawing, in which—

Figure 2:
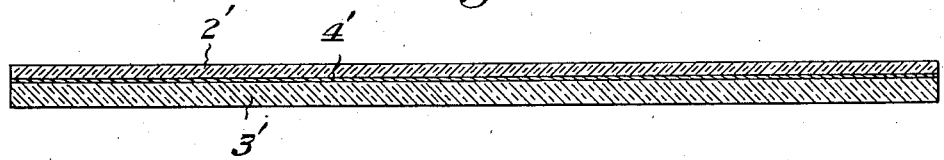

Figure 1 is a section through a laminated sheet made in accordance with my invention, the thickness of glass and the thickness of the cement layer between the sheets being exaggerated; and Figure 2 is a section through a laminated sheet made in accordance with my invention and showing the sheet of drawn glass thinner than the sheet of ground and polished glass.

In Figure 1 of the drawing, 2 designates a sheet of ordinary clear glass, such as cylinder or sheet drawn window glass, and 3 designates a sheet of ground and polished glass. Between the sheets 2 and 3 is a layer of transparent cement 4, such as celluloid, which is commonly used in the manufacture of laminated glass. In Figure 2 of the drawing, 2' designates a sheet of ordinary clear glass and 3' a sheet of ground and polished glass. The sheet of ordinary clear glass 2' may, as shown in the drawing, be appreciably thinner than the sheet of ground and polished glass 3'. Ordinary single strength drawn glass sheets are, as is well known in the art, appreciably thinner than ground and polished glass sheets.

Ordinary clear glass, whether it is sheet drawn or formed from a drawn cylinder, has one surface which is slightly more irregular than the other. In practicing the present invention, I prefer to turn the more irregular side of the glass inwardly.

The laminated plate as described may be made according to any suitable or preferred process.

By combining a sheet of ground and polished glass and a sheet of drawn glass, the laminated plate cannot be easily distinguished from laminated plate made of two sheets of ground and polished glass. The wave-like irregularities of the ordinary drawn glass can scarcely be detected in the laminated plate except when viewed at a very acute angle. Ordinary drawn glass being much cheaper than ground and polished glass, it will be seen that the present invention, even if the drawn glass is ground and polished on one face, effects a very material saving in the cost of manufacturing a commercially satisfactory product for replacing plate glass.

While the drawing shows two constructions made in accordance with my invention, it will be understood that the present invention is not restricted to the particular constructions shown.

I claim:

1. As an article of manufacture, laminated glass comprising a sheet of clear window glass and a sheet of ground and polished glass cemented together.

2. As an article of manufacture, a sheet of laminated glass comprising a layer of window glass and a layer of ground and polished glass, the two layers being cemented together.

3. As an article of manufacture, a sheet of laminated glass having one lamination thereof formed of ground and polished glass and having one lamination formed of clear window glass, one side of which is more irregular than the other, with the more irregular side of the clear glass turned inwardly.

4. As an article of manufacture, a laminated sheet of glass comprising a layer of ground and polished glass and a layer of drawn glass, and a layer of transparent celluloid cementing the two layers of glass.

5. As an article of manufacture, a sheet of laminated glass comprising a layer of ground and polished glass and a layer of window glass united by a layer of non-shatterable material, one face of the layer of window glass having the characteristic wave of drawn sheet glass, said face being united with the layer of non-shatterable material.

6. As an article of manufacture, a sheet of laminated glass comprising a layer of glass ground and polished on both faces, and a second layer of window glass, the two layers being united by a layer of non-shatterable material, one face of said second layer of glass being wavy, said face being united with the layer of non-shatterable material, the other face of said second layer of glass being fire polished.

7. As an article of manufacture, laminated glass comprising a sheet of clear window glass having both of its faces fire polished, and a sheet of glass having both of its faces ground and polished, the sheets being cemented together.

8. As an article of manufacture, laminated glass comprising a sheet of clear window glass having both of its faces fire polished, and a sheet of glass having both of its faces ground and polished, the sheets being cemented to an intervening layer of transparent celluloid.

9. As an article of manufacture, laminated glass comprising a layer of glass having both faces ground and polished, a sheet of non-shatterable material united with one face thereof, and a sheet of window glass having fire polished surfaces united with the other face of the sheet of non-shatterable material.

10. As an article of manufacture, laminated glass comprising a layer of glass having both faces ground and polished, a sheet of non-shatterable material united with one face thereof, and a sheet of window glass having fire polished surfaces united with the other face of the sheet of non-shatterable material, the fire polished sheet having one face containing the characteristic wave of drawn sheet glass, said face being innermost.

11. As an article of manufacture, a sheet of laminated glass comprising a layer of window glass and a layer of ground and polished glass, the layer of window glass being thinner than the layer of ground and polished glass, and the two layers being cemented together.

WILLIAM L. MONRO.